Feb. 14, 1939.  A. J. SCHOLTES  2,147,354
CONTRACTIBLE RING HOSE COUPLING
Filed June 6, 1938
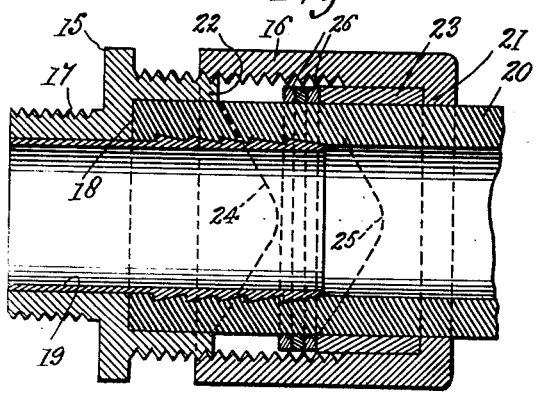
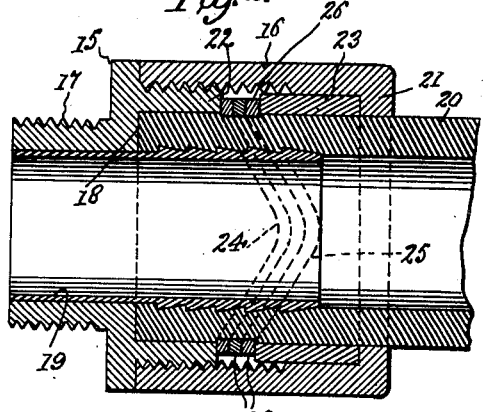
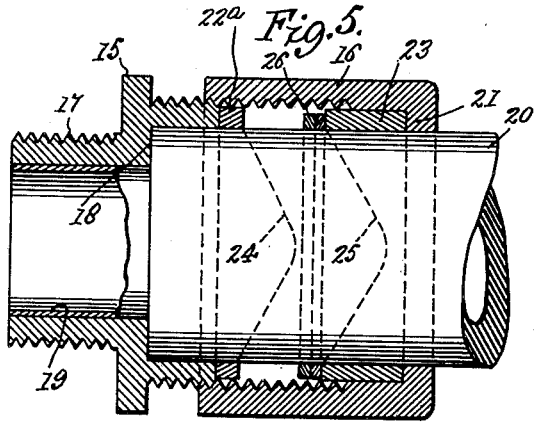
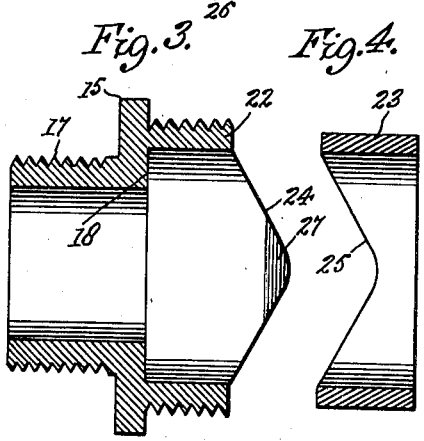
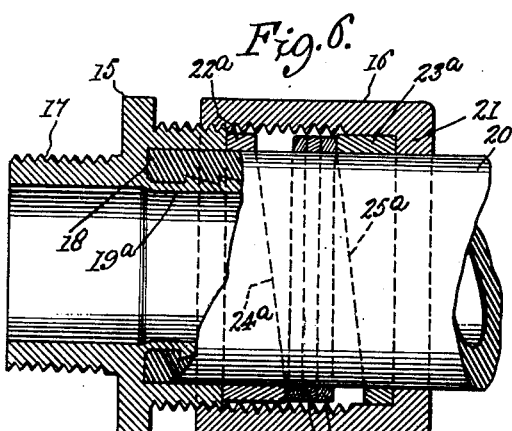
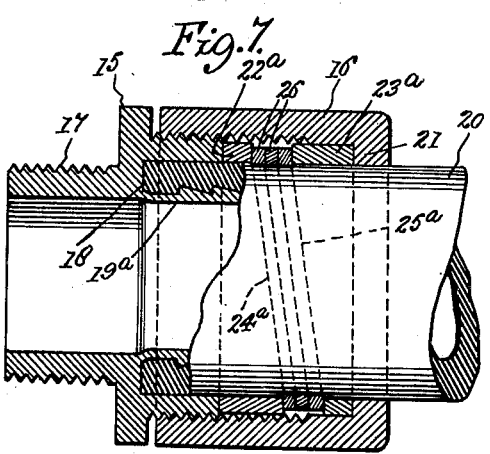
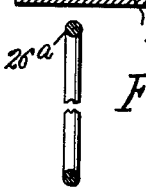
Inventor
Albert J. Scholtes
By Mawhinney & Mawhinney
Attorneys

Patented Feb. 14, 1939

2,147,354

UNITED STATES PATENT OFFICE 2,147,354

CONTRACTIBLE RING HOSE COUPLING

Albert J. Scholtes, Baltimore, Md.

Application June 6, 1938, Serial No. 212,144

7 Claims. (Cl. 285—84)

The present invention relates to hose couplings adapted for securing couplings upon hose, pipes or other cylindrical objects, and has more particular reference to a hose coupling adapted to be firmly secured and sealed upon the end portion of a length of hose.

An object of the present invention is to provide a hose coupling with clamping or locking rings, or their equivalent, which are disposed within the coupling and about the hose, and which are adapted to be contracted by being deformed or by axial displacement of a portion or portions of the rings to contract the same so that the ring will contract upon and bind into the outer surface portion of the hose to firmly lock the same in the coupling and bind the hose therein, and about an internal nipple when the latter is employed.

Another object of the present invention is to provide a hose coupling with relatively movable parts having anvil or displacing portions therein adapted to engage an interposed ring for axially bending or displacing a portion of the ring to contract it when the coupling members are moved together.

A further object of the invention is to provide a contractible hose coupling which is capable of operation upon hose within a wide limit of outside diameter sizes so that a standard hose coupling may be provided for use with hose of different wall thickness and sizes within a wide range; thus economizing in the number of sizes of the hose couplings needed for a given size hose and also in the amount of stock handled for the usual trade demands.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a longitudinal section taken through a contractible ring hose coupling constructed according to the present invention and showing the parts in initial position ready to be drawn up or tightened.

Figure 2 is a similar view with the coupling drawn up and the contractible rings axially deformed and reduced in diameter upon the hose.

Figure 3 is a detail sectional view taken through one of the displacing or anvil elements of the coupling, showing a slight modification in the cam tip of the same.

Figure 4 is a similar sectional view showing in detail the opposite displacement or anvil element which is complemental to the anvil element of Figure 3.

Figure 5 is a longitudinal section taken through a slightly modified form of coupling wherein both anvil elements are independent of their respective coupling members.

Figure 6 is a longitudinal sectional view through another modified form of the coupling, showing another construction of the cooperating anvil elements, the parts in initial position ready to be drawn up.

Figure 7 is a similar view of the same showing the coupling drawn up and the contracting rings axially displaced at one side and contracted upon the outer surface of the hose, and Figure 8 is a detail fragmentary sectional view taken through a modified form of contracting ring.

Any suitable coupling may be used having relatively movable coupling members capable of embracing a hose and exerting a compression force between them. In the present illustration, interthreaded telescoping coupling members 15 and 16 are shown. The coupling member 15 has a reduced externally threaded spud 17, or other suitable coupling part, adapted for connection with another coupling, a nozzle or the like, and which provides an internal shoulder 18 at the bottom or inner end of the coupling member 15. The spud 17 is utilized for supporting a nipple 19 which extends axially through the coupling member 15 and beyond the enlarged end thereof to receive thereover the end portion of a hose 20. As shown in Figures 6 and 7, the nipple 19ª may be an integral part of the coupling member 15, extending axially in spaced relation within the member 15 from the inner wall portion of the spud 17. This provides the necessary annular spaces defined by the shoulder 18 for the reception of the end of the hose 20. The hose 20 abuts the shoulder 18 and the nipple 19 may have teeth or serrations to engage the inner wall of the hose and assist in retaining it in the coupling under axial stress or pressure.

The coupling member 16 is the outer member, and is threaded at one end upon the coupling member 15 and extends beyond the same about the hose 20, and has an inturned flange or shoulder 21 which is opposed to the free end of the coupling member 15 for advancement toward the same to axially contract the annular space between the coupling members when they are turned up one upon the other.

A pair of opposed displacing or anvil elements 22 and 23 are placed about the hose 20 in the annular space between the coupling members 15 and 16, the element 22 being backed by the member 15 while the element 23 is backed by the member 16, against the shoulder 21 of the latter. As shown in Figures 1 to 4, the anvil or displacing element 22 may be integral with the coupling member 15 or, as shown in Figures 5 to 7, the anvil or displacing element 22ᵃ may be a separate ring abutting the inner end of the coupling member 15. It is necessary that at least one of the anvil members 22 and 23 be separate from its coupling member so that as the coupling members 15 and 16 are relatively turned to tighten the coupling the anvil members 22 and 23 will remain in or seek their opposed complementary relation. The elements 22 and 23 are annular, and have complementary opposed working edges 24 and 25 which may be of any suitable shape, such as cam faces as shown, and wherein the member 22 has its working edge 24 in the form of diametrically opposed projecting cams and the member 23 has diametrically opposed corresponding recesses in its working edge 25. In Figure 3, the tip or highest point or points of the cam working face 24 of the anvil member 22 has its inner wall bevelled and rounded, as at 27, so as to allow a portion of the ring 26, when contracted, to draw under the rounded point 27 and provide a powerful end thrust to the end portion of the hose 20 for increasing the sealing of the same against the internal shoulder 18 of the coupling member 15. In the form shown in Figures 1 to 5 the projections and recesses are each extended around the edge of its respective element 22 or 23, for 180 degrees so that the edges 24 and 25 are similar but with the elements 22 and 23 relatively turned through an angle of 90 degrees.

In Figures 6 and 7, the elements 22ᵃ and 23ᵃ have complementary working edges 24ᵃ and 25ᵃ of a slightly modified form, wherein the edges are opposed cams each extending entirely around its entire respective edge, 24ᵃ or 25ᵃ, and wherein the elements 22ᵃ and 23ᵃ are relatively turned through an angle of 180 degrees. These cam faces or edges, 24 and 25, and 24ᵃ and 25ᵃ, automatically assume their opposed positions under compression during the tightening up of the coupling upon the hose.

Contracting rings 26, one or more as desired according to the size of the coupling, character of the hose and the desired gripping effect, are fitted about the hose 20 in the annular space between the anvil members 22 and 23. These rings 26 are continuous, capable of being bent and may be of any desired cross-sectional construction, such as rectangular as shown in Figures 1 and 6 or circular as shown at 26ᵃ in Figure 8.

The rings are disposed between the complementary cam faces 24 and 25 so that when the coupling is drawn up the cams of the face 24 will bend the opposite portions of the rings 26 into the recesses of the face 25; contracting the rings upon the hose 20 and forcing the inner edges thereof into the surface portion of the hose to secure and seal the latter in the coupling and upon the nipple 19.

In the form shown in Figures 6 and 7, the faces 24ᵃ and 25ᵃ of the anvil members are in parallel relation, or are inclined in the same direction from side to side of the anvil members 22ᵃ and 23ᵃ and when the coupling is drawn up, the rings 26 are canted or offset axially of the coupling to conform substantially to the inclination of the anvil faces, as shown in Figure 7, so that the one or more contracting rings 26 are contracted upon and about the outer surface portion of the hose 20. The inner edges of the rings 26 thus are embedded to a more or less extent in the exterior surface of the hose and firmly lock the hose in the coupling and reduce and bind the hose upon and about the nipple 19.

The anvil members 22 or 22ᵃ and 23ᵃ may be of any suitable configuration to provide offset, displaced, or bent portions in the contracting ring 26 so that the ring is reduced in diameter as compared to the transverse plane of the coupling and caused to bind effectively about the hose when the coupling is drawn up.

What is claimed is:

1. A hose coupling, comprising a pair of relatively movable coupling members for engagement over the end of a hose, an axially deformable element for engagement about the hose between the coupling members, and circumferentially spaced apart displacing means between the coupling members at opposite sides of the element for axially displacing circumferentially spaced apart portions of the element when the coupling members are moved together to radially contract the element about the hose and bind the latter in the coupling.

2. A hose coupling, comprising a pair of coupling members adapted to be mounted upon a hose and for movement toward each other as the coupling is tightened, anvil members disposed between said coupling members and having complementary undulating deforming surfaces, and an axially deformable element mounted between the anvil members for engagement about the hose and adapted upon tightening of the coupling to be deformed into circumferentially serpentine shape by said anvil members and contracted upon the outer surface portion of the hose.

3. A hose coupling, comprising a pair of coupling members for relative movement toward each other on a hose, anvil members disposed between said coupling members and having complementary axially displacing surfaces with circumferentially spaced apart deforming portions, and an axially deformable element mounted between the anvil members for engagement about the hose and adapted upon tightening of the coupling to be axially displaced at spaced portions thereabout by said anvil members and contracted upon the outer surface portion of the hose.

4. A hose coupling, comprising an externally threaded coupling member for engagement over the end of a hose, a supporting nipple carried by said coupling for engagement within the end of the hose to support the same, a second coupling member telescoping the first member and having internal threads engaging the same for drawing the coupling members together when relatively turned, cooperating anvil members disposed within the second coupling member and having axially offset circumferentially spaced apart engaging portions, an axially deformable element arranged between said engaging portions of the anvil members for engagement about the hose, said anvil members when the coupling members are drawn together adapted to engage the opposite sides of the element and displace a portion of the same for contracting the element about the hose to secure the latter in the coupling and bind the hose upon the nipple.

5. A hose coupling comprising a coupling member externally threaded and adapted to engage over the end of a hose and having an inner end circumferential cam face, a second coupling member having internal threads engaging over the first coupling member and adapted to be turned up thereon to tighten the coupling, said second coupling member having an inturned flange at its free end adapted to engage about a hose and provide an annular space within the second coupling member, an anvil member mounted in the second coupling member about the hose and engaging the flange of the coupling member and provided with a circumferential cam face at its free edge opposite the cam face of said first coupling member, and an axially deformable element mounted in the annular space within the second coupling member between said cam faces, said coupling members when drawn together adapted to engage said cam faces against the opposite sides of the deformable element for axially displacing a portion of the same to contract the element upon the hose.

6. A hose coupling comprising a pair of coupling members interthreaded for relative turning to tighten the coupling upon a hose, a pair of anvil elements disposed between the coupling members for engagement about the hose and having at their opposed inner edges continuously undulating cam faces of similar construction, said elements adapted for positioning in the coupling in relative angular relation to dispose the cam faces in complementary relation, and a contracting ring for engagement about the hose between the anvil elements, said coupling when tightened adapted to advance the ends of the elements toward each other and engage the cam faces against the opposite sides of the ring for axially deforming the same and contracting the ring and the hose.

7. A hose coupling, comprising a pair of coupling members interconnected for movement toward each other to tighten the coupling on a hose, a pair of anvil members disposed between the coupling members and having at their inner edges opposed parallel and transversely inclined cam faces, and a clamping element for engagement about the hose between the anvil members, said coupling members when drawn together adapted to advance the anvil members against the opposite sides of the element and cant the same in conformity with the cam faces for contracting the element about the hose.

ALBERT J. SCHOLTES.